United States Patent
Kumar et al.

(10) Patent No.: US 8,209,500 B1
(45) Date of Patent: Jun. 26, 2012

(54) METHOD AND APPARATUS FOR PROVIDING INTELLIGENT INTERPRETATION OF CALENDARING INFORMATION TO SCHEDULE COMPUTER DATA OPERATIONS

(75) Inventors: Mukul Kumar, Pune (IN); Subhojit Roy, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1159 days.

(21) Appl. No.: 11/274,541

(22) Filed: Nov. 15, 2005

Related U.S. Application Data

(60) Provisional application No. 60/695,300, filed on Jun. 30, 2005.

(51) Int. Cl.
*G06F 12/00* (2006.01)
*G06F 13/00* (2006.01)
*G06F 13/28* (2006.01)
*G06F 9/46* (2006.01)

(52) U.S. Cl. ............... 711/154; 711/162; 711/E12.001; 711/E12.103; 718/100

(58) Field of Classification Search ............... None
See application file for complete search history.

(56) References Cited

U.S. PATENT DOCUMENTS

| | | | |
|---|---|---|---|
| 7,073,175 B2 * | 7/2006 | Rehg et al. | 718/102 |
| 2003/0182326 A1 * | 9/2003 | Patterson | 707/204 |
| 2005/0120160 A1 * | 6/2005 | Plouffe et al. | 711/1 |
| 2008/0022201 A1 * | 1/2008 | Chen et al. | 715/700 |

OTHER PUBLICATIONS

Kathy Ivens et al. "http://technet.microsoft.com/en-us/library/Bb742547.aspx" Microsoft TechNet: Windows 2000 Task Scheduler. Jan. 2001. Microsoft. pp. 1-8.*
William R. Stanek "http://technet.microsoft.com/en-us/library/bb726974.aspx" Microsoft TechNet: Schedulin Tasks. copy right 1999, published Jan. 1, 2000. Microsoft. pp. 1-6.*
"http://findarticles.com/p/articles/mi_zdpcm/is_200602/ai_n19411682" Schedule a Task for Idle Time. Feb. 2006. PC Magazine. pp. 1-2.*

* cited by examiner

*Primary Examiner* — Edward Dudek, Jr.
*Assistant Examiner* — Matthew Chrzanowski
(74) *Attorney, Agent, or Firm* — Campbell Stephenson LLP

(57) ABSTRACT

A method and apparatus for scheduling a backup operation for a computer is described. The method includes searching a database for at least one record possessing an absence indicia. The method further includes scheduling an operation to be performed during a time period associated with the at least one record.

20 Claims, 3 Drawing Sheets

FIG. 2

METHOD AND APPARATUS FOR PROVIDING INTELLIGENT INTERPRETATION OF CALENDARING INFORMATION TO SCHEDULE COMPUTER DATA OPERATIONS

CROSS-REFERENCE TO RELATED APPLICATIONS

This application claims benefit of U.S. provisional patent application Ser. No. 60/695,300, filed Jun. 30, 2005, which is herein incorporated by reference.

BACKGROUND OF THE INVENTION

1. Field of the Invention

Embodiments of the present invention generally relate to computer management and, more particularly, to scheduling backups or virus scans in a computer system.

2. Description of the Related Art

Backup operations are regularly performed within an enterprise computing environment to protect data stored on network computers. Although networks regularly backup data on system servers, the numerous client computers residing in the network must also be backed up. However, performing backup operations for client desktop and laptop computers can prove to be a challenging endeavor since desktops are frequently shut down during periods on non-use (e.g., non-business hours) and laptop computers are often disconnected from the network for extended periods of time (e.g., when used during travel). However, backup operations may significantly hinder the operation of a client computer if performed during a time when the desktop or laptop is being used. As a result, client computers are typically backed up during the evening (e.g., non-business) hours when the machines are not being utilized. However, since system servers and other large computers belonging to the network are typically backed up during the evening hours, the combination of these backup operations can consume a significant amount of network resources. Similarly, these same concerns that pertain to backup operations also relate to virus scanning operations. Consequently, it would be beneficial for large enterprises if backup operations and virus scans for client computers (e.g., such as desktop and laptop PCs) where not conducted during this time period as well as occasions in which the PCs were being utilized during normal business hours.

Thus, there is a need in the art for a method and apparatus for strategically scheduling the backup and virus scan operations of computers.

SUMMARY OF THE INVENTION

Embodiments of the present invention generally are directed to a method and apparatus for scheduling operations for a computer. Such operations include backups, virus scans, and the like. In one embodiment, the invention includes a backup agent that searches a database stored in the computer for at least one record possessing a user absence indicia, wherein the absence indicia is an indicator that signifies that the computer will not be used during a specified time period, yet the computer will, in all likelihood, be on during that time. The backup agent subsequently schedules a backup operation to be performed during the specified time period that is associated with the at least one record containing the absence indicia. In another embodiment, the invention utilizes a similar agent to conduct virus scans on the computer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 depicts a block diagram of a window interface used to create a record of a calendar event in accordance with the present invention.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not intended to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
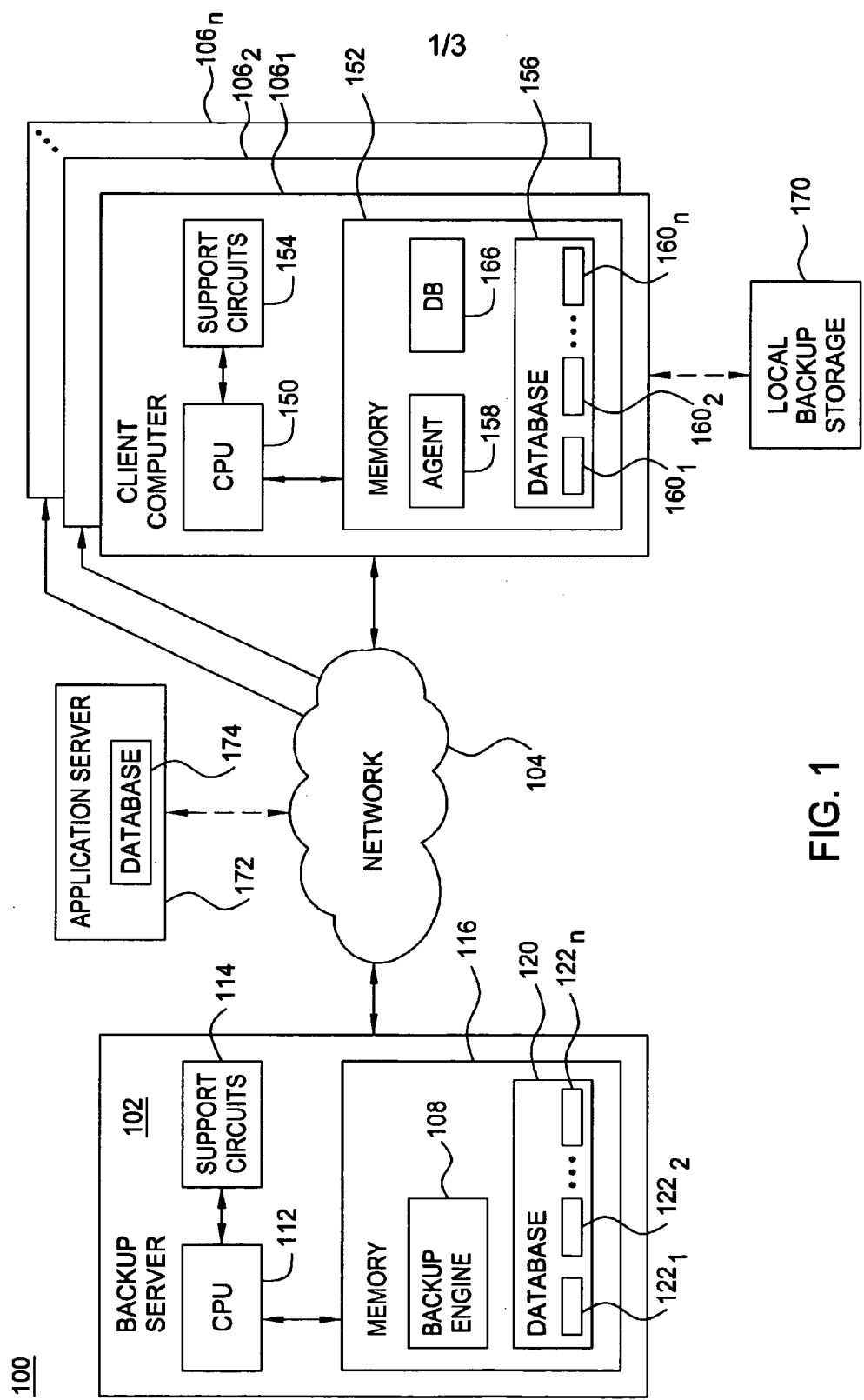
FIG. 1 depicts a computer network in which one embodiment of the invention may be utilized.

FIG. 1 illustrates a computer network 100 in which one embodiment of the present invention may be utilized. The computer network 100 comprises a backup server 102 that is connected to a plurality of client computers $106_{1 \ldots n}$ via a communications network 104. The communications network 104 may be any conventional network, such as an Ethernet network or a fiber channel network. For the sake of simplicity, only one backup server 102 is shown. Those skilled in the art will understand that a plurality of backup servers may be connected to the client computers $106_{1 \ldots n}$ via the communications network 104 and to one another to form a larger network. Similarly, this description will frequently refer to a client computer 106 that is representative of the plurality of client computers $106_1$ through 106. The client computers $106_{1 \ldots n}$ may include one or more individual personal computers (PCs), wireless devices, personal digital assistants, desktop computers, laptop computers or any other digital device that may benefit from connection to a computer network.

A client computer 106 comprises at least one central processing unit (CPU) 150, support circuits 154, and memory 152. The CPU 150 may comprise one or more conventionally available microprocessors. The support circuits 114 are well known circuits that comprise power supplies, clocks, input/output interface circuitry and the like.

Memory 152 may comprise random access memory, read only memory, removable disk memory, flash memory, and various combinations of these types of memory. The memory 152 is sometimes referred to as main memory and may in part be used as cache memory or buffer memory. The memory 152 stores various software packages, such as a software backup agent 158. The backup agent 158 is an application that is responsible for parsing the contents of calendar events and searching for an absence indicia. Generally, absence indicia may include any type of indicator that is present on a calendar event record that signifies that a computer (e.g., a workstation or PC) will not be in use at a designated time yet, in all likelihood, the computer will be on during the non-use period. The backup agent 158 also communicates with the backup server 102 to schedule backup procedures. Lastly, the backup agent 158 may be configured to receive a deactivation (or activation) signal from a user in order to disable or override a scheduled or current backup operation.

The memory 152 also contains a database 156 that stores a plurality of records $160_{1...n}$. These record files $160_{1...n}$ may comprise files pertaining to calendar events or appointments, such as MICROSOFT Outlook calendar entries, LOTUS Notes calendar entries, and the like. Although only one database 156 is depicted, those skilled in the art will recognize that a plurality of databases may be utilized. In one embodiment, the client computer 106 also contains a word/phrase database 166. The database 166 contains a predefined list of words and phrases that assist the agent 158 during a search of records $160_{1...n}$. More specifically, the agent 158 references this database 166 while it is attempting to find a match for words and/or phrases in the calendar records $160_{1...n}$. The words and phrases may be stored in a predefined list that can be modified by a user or network operator.

The backup server 102 may be any type of computer or device on the network that manages backup resources. In one embodiment, the backup server 102 is a dedicated computer that manages the resources, scheduling, and execution of various network backup operations. Although only one backup server 102 is depicted in FIG. 1, those skilled in the art will recognize that a plurality of backup servers may be utilized with the present invention. Alternatively, no backup server may be used and the client may backup its data to a local backup storage 170, such as a CD, DVD, zip drive, and the like.

Backup server 102 comprises at least one central processing unit (CPU) 112, support circuits 114, and memory 116. The CPU 112 may comprise one or more conventionally available microprocessors. The support circuits 114 are well known circuits that comprise power supplies, clocks, input/output interface circuitry and the like.

Memory 116 may comprise random access memory, read only memory, removable disk memory, flash memory, and various combinations of these types of memory. The memory 116 is sometimes referred to as main memory and may in part be used as cache memory or buffer memory. The memory 116 stores various forms of software, such as a server backup engine 108. The server backup engine 108 is responsible for communicating with the backup agent 158 on the client computer (or the client computer itself in the event a backup agent does not exist) to schedule a backup procedure. The memory 116 may also contain a database 120 that stores a plurality of records $122_{1...n}$. This database is necessary if a database of this type is not stored on the client computer, an application server, and the like. The record files $122_{1...n}$ are the most recent backed up copies of the calendar events or appointments, such as MICROSOFT Outlook calendar entries and LOTUS Notes calendar entries, from the client computers $106_{1...n}$. Although only one database 120 is depicted, those skilled in the art will recognize that a plurality of databases may be utilized.

In one embodiment, an application server 172 is coupled to the network 104. The application server 172 may be any type of server that is known in the art capable of supporting various calendaring applications, such as LOTUS Notes or MICROSOFT Exchange. The application server 172 may contain a database 174 that is similar to database 156 or 120. This database 172 is typically utilized in instances where client computer 106 does not possess database 156 (i.e., computer 106 communicates with database 172 and stores calendar records on database 172).

Figure 2:
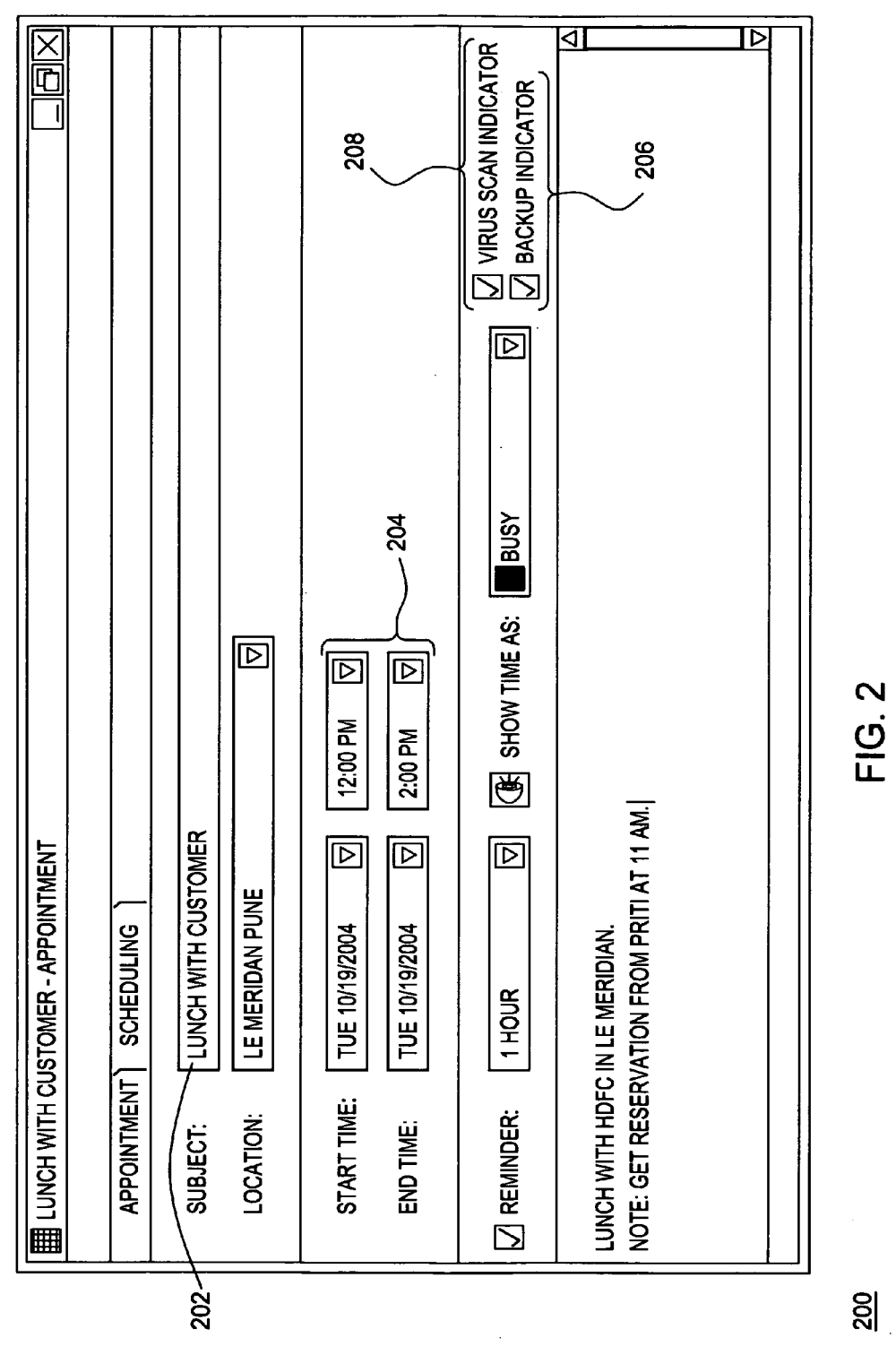

FIG. 2 depicts a block diagram of a window interface 200 used to create a record of a calendar event in accordance with the present invention. The calendar records may be any type of calendar entries associated with a myriad of calendaring applications, including MICROSOFT Outlook or LOTUS Notes. In one embodiment, the window interface 200 possesses a subject field 202 (e.g., text entry field, pull-down menu, checkboxes, etc.) that is used to describe the type of calendar event to be generated. For example, the subject field 202 of a calendar record may describe an event such as a lunch, meeting, appointment, and the like. In one embodiment, this field will be searched or scanned by the backup agent 158 to determine if any words match a predefined list stored in database 166. The window interface 200 also possesses time period field 204 that details the time of the calendar event. For example, the time period field 204 may comprise a pair of pull-down menus associated with a start time and end time of the calendar event (see FIG. 2). Similarly, the time period field 204 may include the duration of the calendar event along with a corresponding start time. The window interface 200 may also include a backup indicator field 206, such as checkbox or pull-down option, that can serve as a backup designation indicator. More specifically, this indicator provides the user with the option of indicating whether the particular calendar event would be an appropriate time for a backup server to perform a backup operation on the client computer. Similarly, a virus scan indicator field 208 may also be present, either alone or coexisting with the backup indicator field 206, depending on the embodiment. However, such indicators are optional and are not a necessity. The invention can determine if a backup or a virus scan is appropriate from other information in the event record.

In one embodiment, a backup indicator 206 (or virus scan indicator 208) may be "selected" to designate a particular calendar event as a time that the user will not be using the computer. By selecting this box (or utilizing some other comparable feature), the backup agent 158 can readily discover the corresponding calendar record without searching the subject field 202 for predefined words or phrases. This facet of the invention may also be utilized to act as an "override" feature. Notably, a user could utilize the backup indicator to designate a particular calendar event as an unacceptable time to perform a backup operation (e.g., by deselecting indicator 206 in FIG. 2), even if the calendar event contained a predefined word such as "lunch" in the subject field. Conversely, a user may designate a particular calendar event as a suitable time for a backup operation, even if the corresponding subject field does not include any predefined terms that indicate absence indicia.

Figure 3:
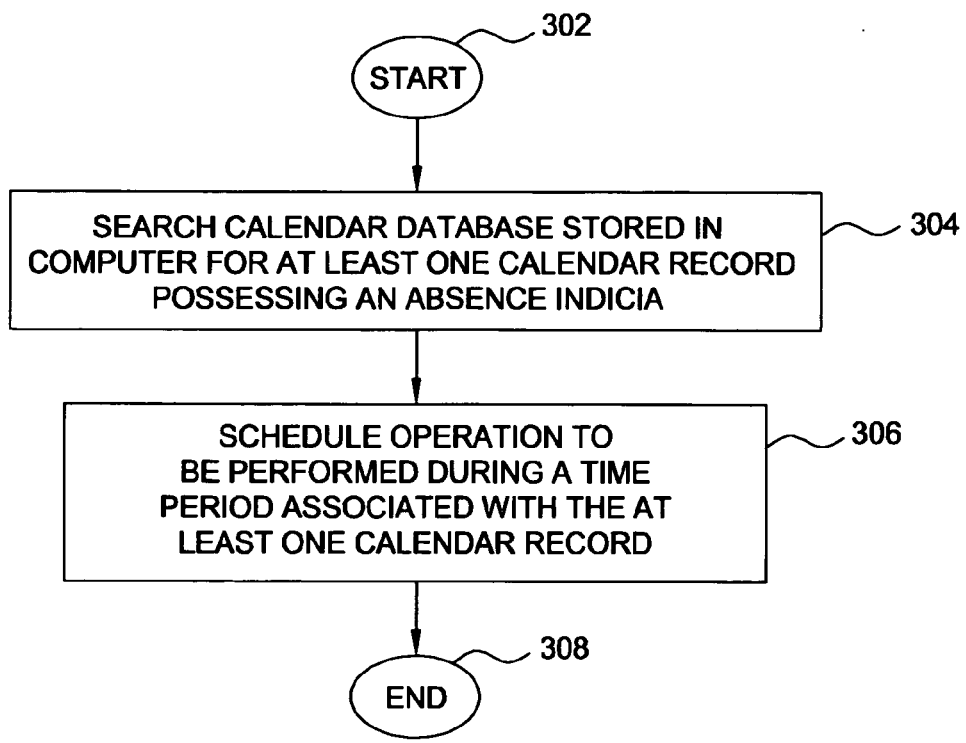
FIG. 3 depicts a flow diagram of a method of storing data to the storage system in accordance with another embodiment of the invention.

FIG. 3 illustrates a flow diagram of a method 300 for scheduling a backup operation for a computer in accordance with one embodiment of the invention using the backup agent 158. This method 300 may be initiated on a periodic basis or predefined schedule by the backup agent 158. Similarly, the backup server 102 may commence the method 300 by sending a prompt to the backup agent 158 that requests the initiation of the process. The method 300 starts at step 302 and proceeds to step 304 where the backup agent 158 searches database 156 for an absence indicia existing in at least one calendar record. The absence indicia may be embodied in any manner that indicates that a user may be away from or not using a computer for a specified period of time (yet the computer will be on and connected to the network). In one embodiment, the backup agent 158 searches the subject field 202 for predefined words or phrases that indicate that a user may not be using a computer during a particular time period. Words such as "lunch", "dinner", "meeting", "appointment", and the like may be predefined to serve as absence indicia. Similarly, words or phrases such as "webinar", "Internet seminar", and the like may be predefined as an indicator of user presence (since these words indicate the need to use a client computer). This is an important feature since a user would not normally desire a backup operation while the client computer 106 was in use. In one embodiment, the agent 158 conducts this search by comparing a list of predefined words in database 166 with the text present in the subject field 202 of the records. When a match is discovered, the agent 158 designates the corresponding record as having absence indicia. In another embodiment, the backup indicator 206 may be used to assist the scheduling process by serving as an absence indicia for a calendar record.

At step 306, the backup agent 158 (or alternatively, backup engine 108) schedules a backup operation to be performed during a time period associated with the calendar record designated with an absence indicia. In one embodiment, the backup agent 158 acquires the appropriate time period directly from the calendar record. More specifically, the backup agent 158 inspects the time period field 204 to determine when the user will be away from the client computer. The backup agent 158 then communicates with the server backup engine 108 on the backup server 102 to determine if the requisite network resources will be available to execute the backup operation. More specifically, the agent 158 sends a list of possible or "candidate" backup times to the backup server for processing. Using this data, the backup server 102 determines when the backup operation will be conducted on the client computer given the resources available at the candidate times. In one embodiment, the server backup engine 108 confirms the scheduled backup operation to the backup agent 158 if the necessary resources are available (e.g., if an excessive amount of backups are not being conducted at the scheduled time). Afterwards, the backup server 102 executes a backup operation during the scheduled time when the computer will not be in use. It is important to note that this step may be disabled or overridden at any time by a user or other entity (e.g., a network administrator, computer program, etc). More specifically, the invention may be configured to receive a deactivation (or activation) command from a user or other authorized entity. The method 300 continues to step 308 and ends.

In another embodiment, the present invention may also be utilized to schedule virus scans of client computers $160_{1...n}$. Like backup operations, virus scans can hinder the performance of a client computer while it is in use by consuming a significant amount of a client computer's resources. Consequently, this invention may be used to strategically schedule virus scan procedures in an enterprise environment. In yet another embodiment, the present invention may be utilized to schedule any operation that would require user absence and the computer to be powered on.

The present invention intelligently selects a backup schedule window that allows multiple backup operations during the day without interfering with the user's normal activities. This effectively provides better data protection within an enterprise environment. Similarly, the present invention also allows for the more efficient utilization of backup resources. By scheduling the backup of client computers during the day, network resources may be dedicated for the backup of network servers during non-business hours. This could help save capital expenditure on backup equipment that would otherwise have been incurred if all backups were to be scheduled at the same time (typically off-peak hours). This invention helps the backup scheduler to effectively distribute backups throughout the day, thus distributing the load on resources due to backup operations.

While the foregoing is directed to embodiments of the present invention, other and further embodiments of the invention may be devised without departing from the basic scope thereof, and the scope thereof is determined by the claims that follow.

The invention claimed is:

1. A method for scheduling an operation for a computer, comprising:
    searching a calendar database, wherein
        said calendar database comprises a plurality of records,
        each record corresponds to a respective calendar event,
        each record comprises a first field,
        said first field of each record comprises text describing said respective calendar event,
        said searching comprises
            comparing text of each of the records with absence indicia of an absence indicia list, wherein
                said absence indicia indicates said computer will not be in use, and
                said absence indicia comprises predefined words;
    in response to a determination that text of a first record matches at least one of said absence indicia, determining a time period of said first record, wherein
        said time period is associated with a first calendar event corresponding to said first record; and
    scheduling said operation to be performed during said time period associated with said first calendar event.

2. The method of claim 1, wherein said operation comprises at least one of a backup operation and a virus scan operation.

3. The method of claim 1, wherein said scheduling comprises:
    creating a candidate list, wherein
        said candidate list comprises time periods of matching records of the plurality of records,
        text of each matching record matches at least one of said absence indicia, and
        said matching records comprise said first record; and
    selecting a scheduled time period from said time periods of said candidate list, wherein
        said scheduled time period is selected based on availability of backup resources during said time periods, and
        said operation is scheduled to be performed during said scheduled time period.

4. The method of claim 1, wherein said each record of the plurality of records comprises information associated with said respective calendar event.

5. The method of claim 1, wherein said scheduling may be disabled or overridden.

6. The method of claim 1, wherein said absence indicia further comprises at least one of: a predefined phrase, a selected virus scan indicator, and a selected backup indicator.

7. The method of claim 1, wherein said scheduling comprises:
sending a request for said operation to be performed during said time period to a server.

8. The method of claim 1, further comprising:
determining whether an indicator field of each record is selected, wherein selection of said indicator field overrides said searching;
in response to a determination that said indicator field of a second record is selected, determining a second time period of said second record, wherein said second time period is associated with a second calendar event corresponding to said second record; and
scheduling said operation to be performed during a second time period associated with said second calendar event.

9. The method of claim 1, further comprising:
determining whether an indicator field of each record is selected, wherein selection of said indicator field overrides said searching; and
in response to a determination that said indicator field of a second record is selected, designating a time period of said second record as an unacceptable time to perform said operation.

10. A system for scheduling an operation, comprising:
a client computer comprising a backup agent configured to search a calendar database stored in said client computer, wherein
said calendar database comprises a plurality of records,
each record corresponds to a respective calendar event,
each record comprises a first field,
said first field of each record comprises text describing said respective calendar event,
said backup agent is further configured to
compare text of each of the records with absence indicia of an absence indicia list, wherein
said absence indicia indicates said client computer will not be in use, and
said absence indicia comprise predefined words,
determine a time period of a first record, in response to a determination that text of said first record matches at least one of said absence indicia, wherein
said time period is associated with a first calendar event corresponding to said first record, and
schedule said backup operation to be performed during said time period associated with said first calendar event; and
a backup server configured to
receive a request to perform said operation during said time period from said backup agent.

11. The system of claim 10, wherein
said backup agent is further configured to
create a candidate list, wherein record
said candidate list comprises time periods of matching records of the plurality of records,
text of each matching record matches at least one of said absence indicia,
said matching records comprise said first record, and
said request comprises said candidate list.

12. The system of claim 11, wherein
said backup server is further configured to
select a scheduled time period from said time periods of said candidate list, wherein
said scheduled time period is selected based on availability of backup resources during said time periods, and
said operation is scheduled to be performed during said scheduled time period.

13. The system of claim 10, wherein said operation comprises at least one of a backup operation and a virus scan operation.

14. The system of claim 10, wherein
said backup agent is further configured to override a scheduled operation.

15. The system of claim 10, wherein said absence indicia list further comprises at least one of: a predefined phrase, a selected virus scan indicator, and a selected backup indicator.

16. A non-transitory computer readable medium having stored thereon instructions that, when executed by a processor, cause the processor to perform a method for scheduling an operation for a computer, comprising:
searching a calendar database, wherein
said calendar database comprises a plurality of records,
each record corresponds to a respective calendar event,
each record comprises a first field,
said first field of each record comprises text describing said respective calendar event,
said searching comprises
comparing text of each of the records with absence indicia of an absence indicia list, wherein
said absence indicia indicates said computer will not be in use, and
said absence indicia comprise predefined words;
in response to a determination that text of a first record matches at least one of said absence indicia list, determining a time period of said first record, wherein
said time period is associated with a first calendar event corresponding to said first record; and
scheduling said operation to be performed during said time period associated with said first calendar event.

17. The non-transitory computer readable medium of claim 16, wherein said scheduling further comprises
creating a candidate list, wherein
said candidate list comprises time periods of matching records of the plurality of records,
text of each matching record matches at least one of said absence indicia list, and
said matching records comprise said first record.

18. The non-transitory computer readable medium of claim 17, said method further comprising:
sending said candidate list to a backup server.

19. The non-transitory computer readable medium of claim 17, wherein said scheduling further comprises:
selecting a scheduled time period from said time periods of said candidate list,
wherein
said scheduled time period is selected based on availability of backup resources during said time periods, and
said operation is scheduled to be performed during said scheduled time period.

20. The non-transitory computer readable medium of claim 16, wherein said absence indicia list further comprises at least one of: a predefined phrase, a selected virus scan indicator, and a selected backup indicator.

* * * * *